United States Patent
Huard et al.

(10) Patent No.: US 9,206,903 B2
(45) Date of Patent: Dec. 8, 2015

(54) LOCKING COLLAR FOR CYLINDRICAL CAVITY

(75) Inventors: Michael F. Huard, Easthampton, MA (US); Mark R. Wilkinson, Huntington, MA (US)

(73) Assignee: SEAL RYT CORP., Westfield, MA (US)

( * ) Notice: Subject to any disclaimer, the term of this patent is extended or adjusted under 35 U.S.C. 154(b) by 30 days.

(21) Appl. No.: 13/302,130

(22) Filed: Nov. 22, 2011

(65) Prior Publication Data

US 2013/0127121 A1    May 23, 2013

(51) Int. Cl.
*B25G 3/24* (2006.01)
*F16B 2/02* (2006.01)
*F16B 7/04* (2006.01)
*F16J 15/16* (2006.01)

(52) U.S. Cl.
CPC .......... *F16J 15/164* (2013.01); *Y10T 29/49826* (2015.01); *Y10T 403/53* (2015.01)

(58) Field of Classification Search
CPC ....... F16B 17/00; F16B 21/20; Y10T 403/53; Y10T 403/535; Y10T 403/69; Y10T 29/49947; Y10T 29/49948; Y10T 29/49963
USPC .......... 403/46, 289, 290, 344, 348, 366–371, 403/315, 316, 319, 332, 375; 248/229.13, 248/229.23, 230.4, 231.51; 29/434, 525.01, 29/525.02, 525.11; 277/609, 616, 630, 277/637

See application file for complete search history.

(56) References Cited

U.S. PATENT DOCUMENTS

| | | | | |
|---|---|---|---|---|
| 2,295,716 | A * | 9/1942 | Cox | 285/410 |
| 2,654,404 | A * | 10/1953 | Neuhauser et al. | 83/808 |
| 3,067,742 | A * | 12/1962 | Linke et al. | 604/414 |
| 3,269,159 | A * | 8/1966 | Young | 70/232 |
| 3,380,267 | A * | 4/1968 | Winchester | 70/232 |
| 4,386,919 | A | 6/1983 | Kadono | |
| 4,457,445 | A * | 7/1984 | Hanks et al. | 220/214 |
| 4,526,388 | A * | 7/1985 | Marshall | 277/565 |
| 4,971,318 | A * | 11/1990 | Tracy | 482/107 |
| 4,981,389 | A * | 1/1991 | Keon | 403/290 |
| 5,026,352 | A * | 6/1991 | Anderson | 604/178 |
| 5,431,459 | A | 7/1995 | Gundy | |
| 5,593,125 | A * | 1/1997 | Storz et al. | 248/316.5 |
| 6,098,256 | A * | 8/2000 | Poussard | 24/704.1 |
| 6,450,465 | B1 * | 9/2002 | Eslick | 248/230.4 |
| 6,805,359 | B2 | 10/2004 | Neuhaus et al. | |
| 6,834,862 | B2 | 12/2004 | Wilkinson | |
| 7,300,210 | B2 * | 11/2007 | Johnson et al. | 384/537 |
| 7,383,885 | B2 * | 6/2008 | Bergeron et al. | 166/345 |
| 7,771,245 | B2 * | 8/2010 | Routeau et al. | 441/133 |

* cited by examiner

*Primary Examiner* — Gregory Binda
*Assistant Examiner* — Nahid Amiri
(74) *Attorney, Agent, or Firm* — Michael I. Wolfson; William H. Dippert (57) ABSTRACT

A locking collar to be inserted into a cylindrical cavity or lumen of a device for securing mechanical elements from moving axially within the cavity. The collar includes two semi-circular cylindrical segments hinged together with an opposed single slit to allow easy installation within the cavity and pushed into position against the installed elements without the need to disassemble a device. The collar is a substantially cylindrical rigid member with an outer diameter closely matching the inner bore diameter of the cavity and includes an opening at the slit to receive a securing screw member to urge the two segments apart to engage the inner bore surface of the cavity and fix the collar in place thereby locking the elements in place.

22 Claims, 6 Drawing Sheets

LOCKING COLLAR FOR CYLINDRICAL CAVITY

BACKGROUND OF THE INVENTION

This invention relates to a locking collar for installation in a cylindrical cavity or a stuffing box of a rotary mechanical device, and more particularly to a two-piece collar to be placed in a cylindrical cavity, and to a method for installing the collar.

Rotary mechanical devices, such as mixers and centrifugal pumps, include an impeller mounted on a shaft which is driven by an electric motor. The shaft passes through a seal cavity or a stuffing box defined by a cylindrical cavity in the device housing. Typically, the shaft is supported by bearings at the motor end and seals are placed in the stuffing box to engage the shaft to prevent fluid from passing through the seal cavity and reaching the bearing and the motor to avoid causing damage to both.

In mechanical pumps, the seal cavity passes chemical fluids, solids, or solvents being pumped, many of which are corrosive or erosive. Accordingly, it is important that appropriate packing material is placed within the seal cavity. The end of the seal cavity is closed by a gland follower which can be adjusted axially to fix the position of mechanical seal elements.

Typically seal water is pumped into the seal cavity through a flush port (1) to prevent the fluid being pumped or mixed from traveling along the shaft to the bearings and motor and (2) to provide lubricant to the packing. It is desirable to prevent movement of seals or other mechanical elements about the shaft. Thus, it is highly desirable to provide a locking collar that prevents axial movement of these mechanical elements.

A suitable stuffing box with a bearing sealing element and system is described and claimed in U.S. Pat. No. 6,834,862 to Mark R. Wilkinson, the contents of which are incorporated by reference in their entirety. This patent describes a seal system including a bearing element with a bearing surface. This shaft sealing system works well, particularly when an additional bearing surface for the shaft is required. A rigid locking collar is desirable to fix the axial portion of the sealing elements.

While there are a wide variety of devices available for locking mechanical elements in place in rotary mechanical devices, it is desirable to provide an improved locking collar that can easily be installed in a seal cavity or stuffing box of such a device without the need to disassemble the device.

SUMMARY OF THE INVENTION

Generally speaking, in accordance with the invention, a substantially rigid locking collar for installation in a cylindrical cavity or lumen, such as a seal cavity or stuffing box of a rotary mechanical device with a shaft driven by a motor, is provided. The locking collar includes two semi-circular cylindrical segments hinged together at one end with an opposed single slit formed at the other end to allow easy installation in the cavity over the shaft of the device. The locking collar has an outer diameter comparable to the bore of the inner bore of the cavity and an inner diameter greater than the diameter of the pump shaft. When fixed in position, the locking collar prevents axial movement of mechanical elements in the cavity. The annular space between the outer surface of the shaft and the inner surface of the locking collar in a pump cavity allows for pump flush fluids to flow within the cavity.

The two semi-circular segments of the locking collar are hinged with an opposed mating slit to facilitate placing the locking collar around the shaft adjacent to the mechanical element. A locking member, such as a threaded screw, is installed at the slit to fix the position of the locking collar. The locking member is aligned axially and is threaded into one or both edges of the slit opposite the hinge. Tightening the locking member forces the two annular pieces away from each other so that the locking collar is urged against the inner wall of the cavity and sits securely in position within the cavity. Once the locking collar is locked in place, the axial position of the mechanical element adjacent the locking collar is fixed.

Accordingly, it is an object of the invention to provide an improved locking collar for a cylindrical cavity.

A seal system including seal elements and the locking collar is also provided.

It is another object of the invention to provide an improved two-piece locking collar for a rotary mechanical device with a hinge to facilitate installation.

It is a further object of the invention to provide an improved two-piece hinged locking collar with an opposed mating slit.

It is yet another object of the invention to provide an improved two-piece hinged locking collar with an opposed slit having a semi-circular opening for receiving a locking screw.

It is yet a further object of the invention to provide an improved two-piece hinged locking collar with an opposed notched slit.

It is still another object of the invention to provide an improved two-piece hinged locking collar for a rotary mechanical device having an opposed slit with an angled screw receiving opening for locking the collar in place.

It is still a further object of the invention to provide an improved seal system for a rotary mechanical device including a locking collar to prevent axial movement of mechanical elements in the cavity.

Still other objects and advantages of the invention will in part be obvious and will in part be apparent from the specification.

The invention comprises a product possessing the features, properties, and the relation of components which will be exemplified in the product hereinafter described and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
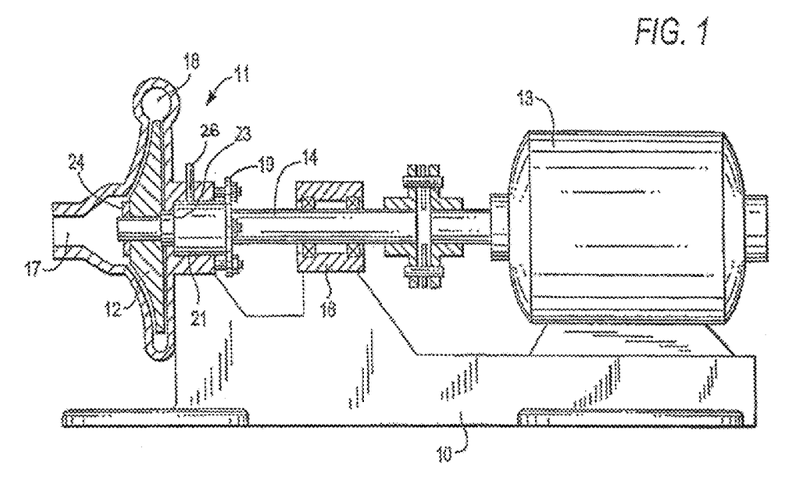
FIG. 1 is a partial cross-sectional view of a typical centrifugal fluid pump.

FIG. 1 illustrates a generic form of a centrifugal pump 11 in cross-section mounted on a frame 10. Pump 11 includes a centrifugal impeller 12 driven by an electric motor 13 that drives a rotary shaft 14 coupled to impeller 12. Shaft 14 is supported by a bearing housing 16 and rotates to draw fluid in through an impeller inlet 17 and expel the fluid out through a radial impeller outlet 18. Pump 11 includes a housing 19 having an internal bore 21 that defines a seal cavity or stuffing box 22 with shaft 14 passing therethrough as shown in detail in FIG. 2. Housing 19 includes an opening 23 through which shaft 14 passes to engage impeller 12 secured to shaft 14 by a nut or fastener 24. Housing 19 also includes a flush port 26 for introduction of a seal fluid, such as water, into seal cavity 22.

Pump 11 operates by drawing a fluid to be pumped into inlet 17 and forced to exit at outlet 18. During pumping, fluid tends to migrate and be forced into seal cavity 22 through opening 23. A wide variety of seals and packing configurations are available to be placed in seal cavity 22 abutting opening 23 in order to restrict and limit entry of pumped fluid into seal cavity 22. If fluid enters seal cavity 22 and migrates to bearings at the motor end, the bearings may be subject to substantial degradation due to the corrosive action of the pumped fluid.

Figure 2:
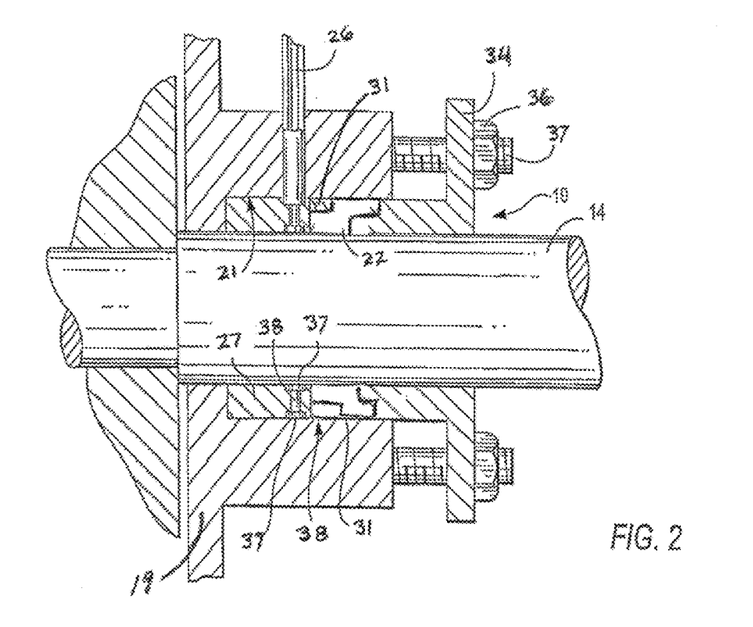
FIG. 2 is an enlarged cross-sectional view of the seal cavity of the pump of FIG. 1 showing a shaft sealing system with a sealing element and a locking collar in place in the seal cavity in accordance with the invention.

FIG. 2 is an enlarged view of seal cavity 22 with a sealing element such as a bearing seal element 27. A locking collar 31 is positioned against seal element 27 to hold it in place in accordance with the invention. The motor end of seal cavity 22 is defined by a gland follower or mechanical seal 34 about shaft 14 and secured to housing 19 by gland bolts 36 and gland nuts 37.

As shown in FIG. 2, shaft seal element 27 is installed in seal cavity 22 at the impeller end of seal cavity 22 and is secured in position by locking collar 31 positioned against seal element 27 on the motor side thereof. Seal element 27 may be a rigid sealing bearing member of stainless steel, a non-ferrous carbon or glass filled thermoplastic material, such as polytetrafluoroethylene (PTFE), or another suitable material as described in U.S. Pat. No. 6,834,862. Seal element 27 may be a semi-rigid bushing as described in co-pending U.S. patent application Ser. No. 11/432,679, filed May 11, 2006. The contents of the patent and the patent application are incorporated herein by reference in their entirety.

In the embodiment illustrated, an integral lantern ring 28 is formed in seal element 27 aligned with flush port 26. A pair of O-rings 29 are placed in grooves on the inner diameter of seal element 27 against shaft 14.

Figure 3:
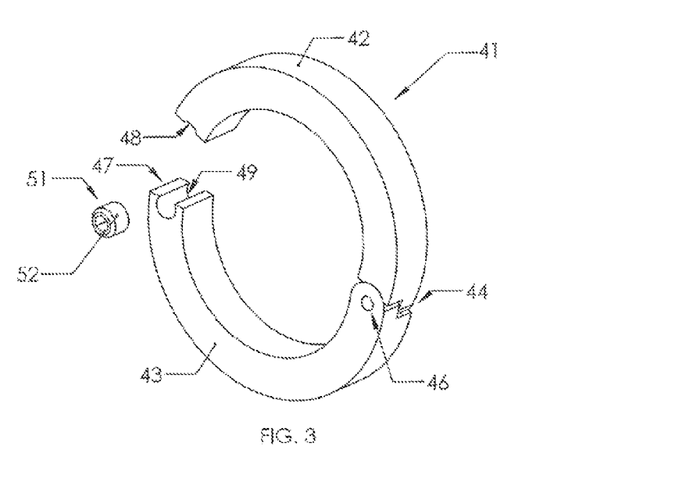
FIG. 3 is a perspective view of a two-piece hinged locking collar with a slit with semi-circular receiving openings constructed and arranged in accordance with an embodiment of the invention.

In FIG. 3, a two-piece locking collar 41 constructed and arranged in accordance with the invention is shown in perspective. Locking collar 41 is custom made for the bore of a particular rotary device. Dimensions vary depending on the size of the inner bore of the device, as will be described in detail in connection with the examples. Locking collar 41 comprises a first semi-circular segment 42 and a mating second semi-circular segment 43, joined together at a hinge 44 by a hinge rivet 46. A slit 47 formed opposite hinge 44 includes a portion of a threaded receiving opening 48 on first segment 42 and a threaded receiving opening portion 49 on second segment 43.

When locking collar 41 is positioned against a mechanical element in a device cavity, such as seal element 27, a threaded locking member 51 having an external thread 52 is threaded into the opening formed by receiving opening portions 48 and 49 to force segment 42 and 43 apart and thereby locked against internal bore 21 of seal cavity 22. This prevents axial movement in the direction of shaft 14 of seal element 27 placed at the impeller end of seal cavity 22.

The use of locking collar 41 and a mechanical seal as the sealing device avoids the need to utilize flexible packing rings at the motor end of seal cavity 22, as is customary in the art. Locking collar 41 prevents movement of seal element 27 and avoids the need to use and replace packing. This advantageously extends the intervals between required seal cavity maintenance.

Figure 4A:
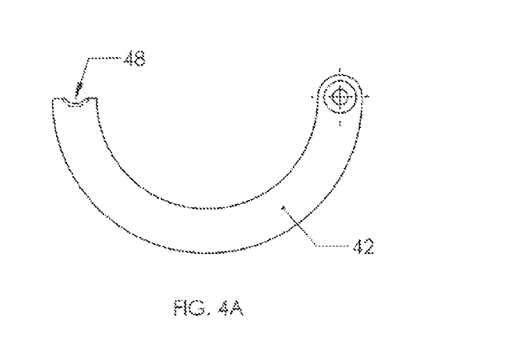
FIGS. 4A and 4B are each a side elevational view of a segment of the locking collar of FIG. 3.
Figure 4B:
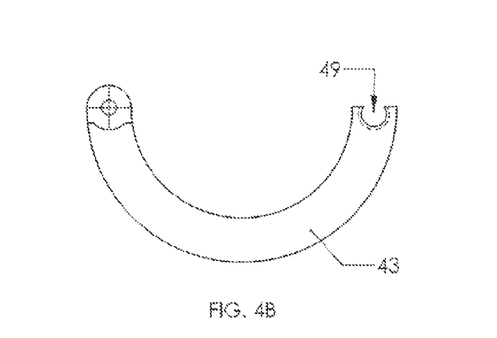
Figure 5A:
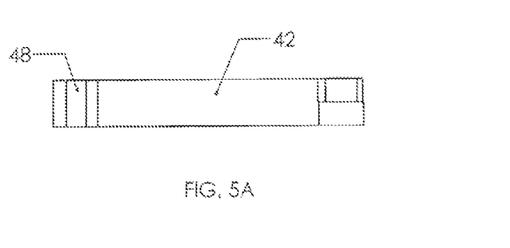
FIGS. 5A and 5B are each a top plan view of a segment of the locking collar of FIGS. 4A and 4B, respectively.
Figure 5B:
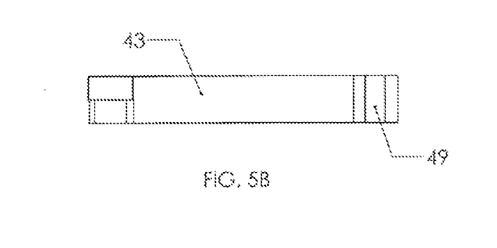

FIGS. 4A and 4B show elevational views of segments 42 and 43, respectively. FIGS. 5A and 5B are each a plan view showing opening portions 48 and 49 in segments 42 and 43, respectively.

In the embodiment illustrated in FIG. 2, an inner seal fluid groove 33 is formed in seal element 27 at a position corresponding to the location of an outer seal fluid groove 34 to create lantern ring 28 at the gland end of seal element 27. A plurality of seal fluid holes are formed between outer seal water groove 34 and an inner seal water groove as described in detail in U.S. Pat. No. 6,834,862. Here, seal element 27 includes two O-rings 29 on its inner surface adjacent shaft 14.

To be able to lock locking collar 31 in position in seal cavity 22, first segment 42 and second segment 43 are pivoted open about hinge 44 and placed around shaft 14. Once around shaft 14, locking collar 31 is positioned against seal element 27 and a threaded locking member 51 is threaded into a threaded receiving opening formed by opening segments 48 and 49 in slit 47. As locking member 51 moves into the threaded receiving opening, segments 42 and 43 move in a substantially radial direction to seal seal cavity 22.

Figure 6:
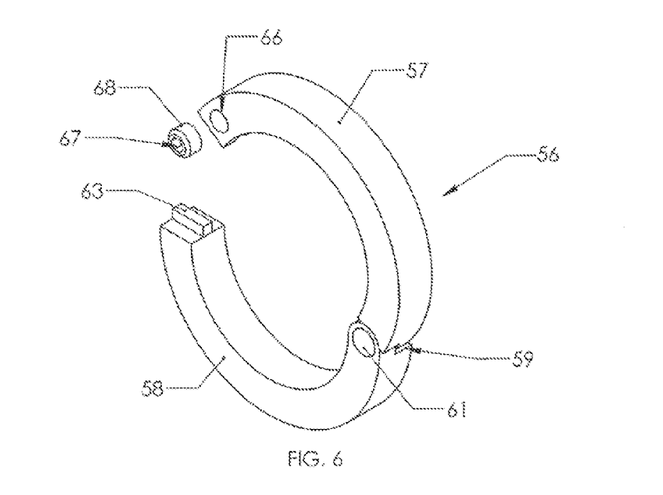
FIG. 6 is a perspective view of a two-piece hinged locking collar formed with a longitudinal notched slit and receiving opening in accordance with another embodiment of the invention.

FIG. 6 represents a two-piece locking collar 56 with a notched slit constructed and arranged in accordance with the invention as shown in perspective. As with locking collar 41 in FIG. 3, locking collar 56 is custom made for the bore of a particular rotary device. Locking collar 56 includes a first semi-circular segment 57 and a mating second semi-circular segment 58 joined together at a hinge 59 with a hinge rivet 61.

A slit 62 formed opposite hinge 59 includes a notch projection 63 formed on the edge of second segment 58 and a receiving notch slot 64 formed on the mating edge of first segment 57. This projection 63 and notch 64 ensure proper alignment of locking collar 56 against inner bore 21 of device cavity 22. A threaded receiving opening 66 is formed on first segment 57 through at least a portion of receiving notch opening 66. When locking collar 56 is positioned about a shaft and against a mechanical element, such as seal element 27 in FIG. 2, a locking member 67 having an external thread 68 is threaded into receiving opening 66 to force segments 57 and 58 apart. This moves segments 57 and 58 of locking collar 56 in a substantially radial direction to lock segments 57 and 58 against internal bore 21 of seal cavity 22.

Once locking collar 56 is locked in place, this prevents axial movement of seal element 27 placed at the impeller end of seal cavity 22. Use of locking collar 56 as in the case of locking collars 31 and 41 avoids the need to utilize flexible packing rings at the motor end of seal cavity 22 and extends the interval between required seal cavity maintenance.

Figure 7A:
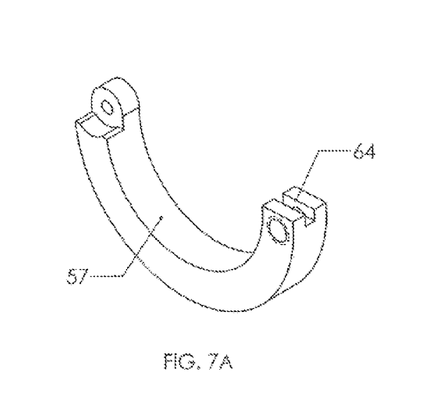
FIGS. 7A and 7B are each a perspective view of a segment of the locking collar of FIG. 6.
Figure 7B:
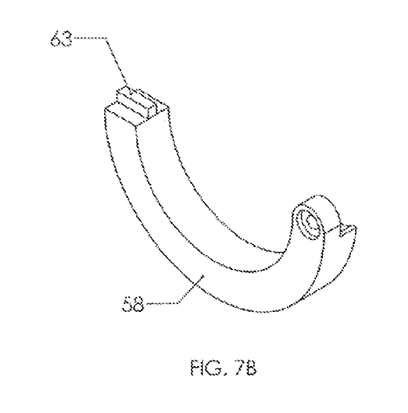
Figure 8A:
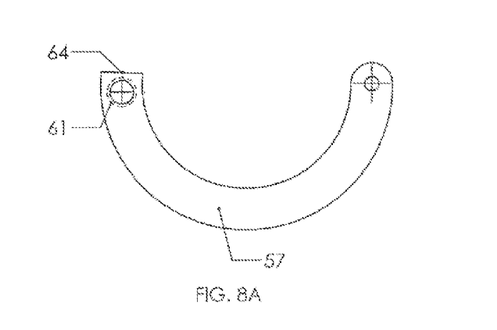
FIGS. 8A and 8B are each a side elevational view of a segment of the locking collar of FIG. 6.
Figure 8B:
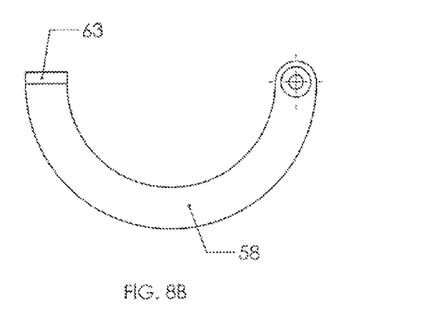
Figure 9A:
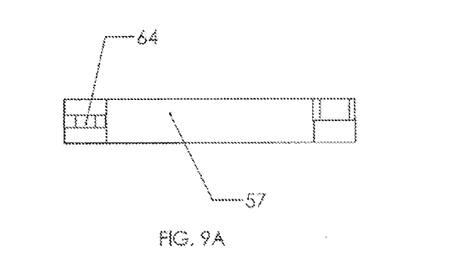
FIGS. 9A and 9B are each a plan view of a segment of the locking collar of FIGS. 8A and 8B, respectively.
Figure 9B:
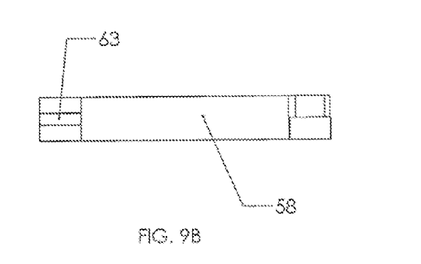

FIGS. 7A and 7B are each a perspective view of locking collar segments 57 and 58, respectively. FIGS. 8A and 8B are each an elevational view of segments 57 and 58, respectively, and FIGS. 9A and 9B are each a plan view showing the inner side of segments 57 and 58, respectively.

Figure 10:
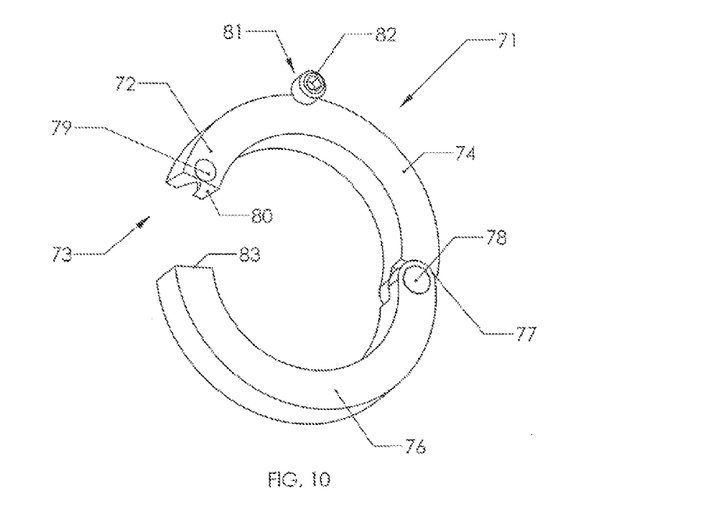
FIG. 10 is a perspective view of a two-piece hinged locking collar with an angled screw locking element receiving opening constructed and arranged in accordance with another embodiment of the invention.

With reference to FIG. 10, a two-piece locking collar 71 with an angled screw receiving opening 72 at a slit 73 constructed and arranged in accordance with the invention is shown in perspective. As with locking collar 41 in FIG. 3, locking collar 71 is custom made for the bore of a particular rotary device. Locking collar 71 includes a first semi-circular segment 74 and a mating second semi-circular segment 76 joined together at a hinge 77 with a hinge rivet 78.

Slit 73 formed opposite hinge 77 includes a flat mating edge 80 formed on the mating edge of first segment 74 and a flat mating edge 83 formed on second segment 76. Angled receiving opening 72 includes and internal thread 79 is formed in first segment 67 through at least a portion of edge 74a of first segment 74. When locking collar 71 is positioned about a shaft and against a mechanical element, such as seal element 27 in FIG. 2, a threaded locking member 81 having an external thread 82 is threaded into angled receiving opening 72 to force segments 74 and 76 apart and thereby locked at the internal bore of a cylindrical cavity.

Once locking collar 71 is locked in place, this prevents axial movement of, for example, seal element 27 placed at the impeller end of seal cavity 22. Use of locking collar 71 as in the case of locking collar 31, 41 and 56 avoids the need to utilize flexible packing rings at the motor end of seal cavity 22 as is customary in the art. Locking collar 71 prevents movement of elements, such as seal element 27, and avoids the need to use and replace packing and extends the interval between required seal cavity maintenance.

Figure 11A:
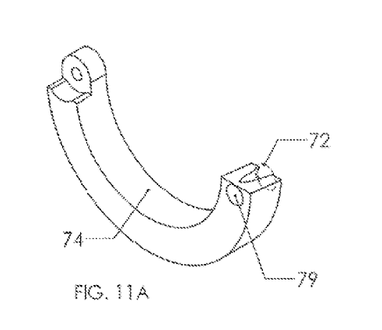
FIGS. 11A and 11B are each a perspective view of a segment of the locking collar of FIG. 10.
Figure 11B:
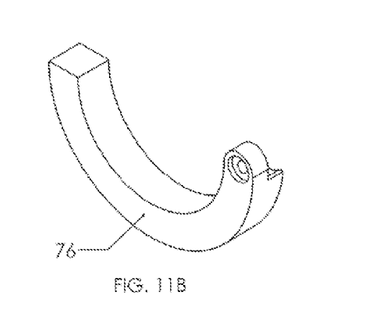
Figure 12A:
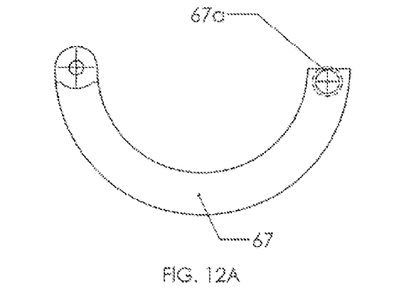
FIGS. 12A and 12B are each an elevational view of a segment of the locking collar of FIG. 10.
Figure 12B:
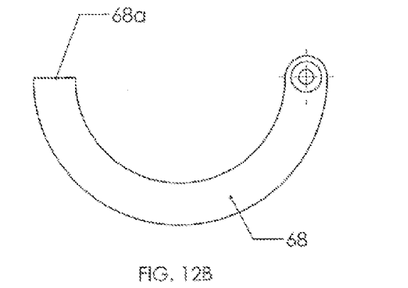
Figure 13A:
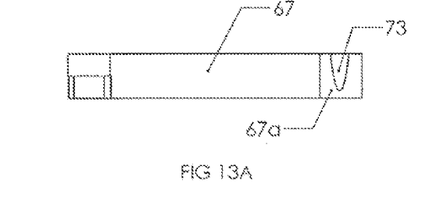
FIGS. 13A and 13B are each a perspective view of a segment of the locking collar of FIGS. 12A and 12B, respectively.
Figure 13B:
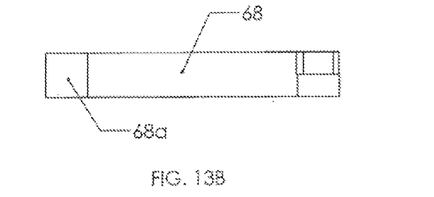

FIGS. 11A and 11B are each a perspective view of segments 74 and 76, respectively. FIGS. 12A and 12B are each an elevational view of segments 74 and 76, respectively, and FIGS. 13A and 13B are each a plan view showing the inner side of segments 74 and 76, respectively.

Locking collars in accordance with the invention are generally made with an outside diameter smaller than the diameter of the inner bore of a receiving cylindrical cavity. Preferably the outside diameter is from about 0.005 to about 0.015 inch, preferably about 0.010 inch, smaller. The outside diameter may vary, that is, it may not be uniform. The inside diameter of the locking collar is generally about 0.750 inch smaller than its outside diameter. This will provide a standard 0.375 inch square cross-section for a locking collar having a length of 0.375 inch. This 0.375 inch square may vary from about 0.312 to about 0.437 inch.

Figure 14:
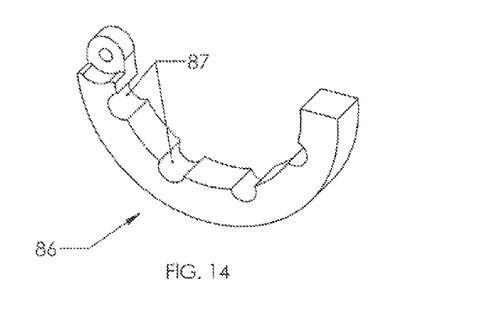
FIG. 14 is a perspective view of the collar segment of FIG. 7A modified to include flush grooves.

For use in a rotary device seal cavity where the distance between the shaft and the inner bore is less than 0.375 inch, the bore clearance should be maintained from about 0.050 to about 0.150 inch, but the inner diameter of the locking collar will be from about 0.020 inch to about 0.040 inch, preferably about 0.030 inch, greater than the diameter of the shaft. In a case where more flush is needed to cool the device, axial grooves may be formed in the inner diameter of the locking collar. FIG. 14 shows one segment 86 of such a locking collar as collar segment 58 of FIG. 7A having a plurality of axial grooves 87 to provide more cavity volume.

When a cylindrical cavity has an inner bore of 5.00 inches or greater, the length of the locking collar is increased by a factor of from about 1.15 to about 1.35 times per inch over 5.00 inches, preferably about 1.25 times per inch. For example:

|  | Square |
| --- | --- |
| Standard (bore less than 5.00") | 0.375 inch |
| Bores over 5.00" (1.25 × .375) | 0.469 inch |
| Bores over 6.00" (1.25 × .469) | 0.586 inch |
| Bores over 7.00" (1.25 × .586) | 0.733 inch |

For use in devices where the operating pressures are over 1,000 psi, the standard length of the locking collar is 0.5000 inch. This is increased by a factor of from about 1.15 to about 1.35 times per inch, preferably about 1.25 times per inch, over 5.00 inches. For example:

|  | Length |
| --- | --- |
| Standard (bores <5.00 inch) | 0.500 inch |
| Bores over 5.00" (1.25 × 0.500) | 0.625 inch |
| Bores over 6.00" (1.25 × 0.629) | 0.781 inch |
| Bores over 7.00" (1.25 × 7.81) | 0.977 inch |

Locking collars 31, 41, 56 and 71 are substantially rigid and formed of materials which will not be attacked or destroyed by corrosive fluids being transported by pump 11. The material of construction includes a wide variety of material. These include non-ferrous metals, silica-based materials, carbonaceous materials, and polymeric materials, such as nylon, polyacetals, polyvinylchloride, polyethylene, polypropylene and fluorine containing polymers, such as polytetrafluoroethylene (PTFE), perfluoroalkoxy (PFA), or other suitable plastic material. The polymeric materials may be filled or unfilled. Filled materials may include a molybdenum/carbon or glass filled thermoplastic material, such as a PTFE, PFA and nylon.

EXAMPLES

Example 1

The dimensions of locking collar 22 in accordance with the invention made of filled PTFE where the inner bore of the cavity is 3.50 inches in diameter are as follows:
 (1) Outer diameter of the collar is 3.49 inches;
 (1) Inner diameter of the collar is 2.74 inches;
 (2) Length of the collar is 0.5 inch; and
 (2) Diameter of the threaded receiving opening is 0.17 inch.

Example 2

The dimensions of notched locking collar 41 in accordance with the invention made of filled PTFE bearing material where the inner bore of the cavity is 2.5 inches in diameter are as follows:

(1) Outer diameter of the collar is 2.49 inches;
(2) Inner diameter of the collar is 1.78 inches;
(3) Length of the collar is 0.375 inch;
(4) Height of projecting notch 58 and length each is 0.10 inch; and
(5) Diameter of the threaded receiving opening is 0.17 inch.

Example 3

The dimensions of angled receiving opening locking collar 71 in accordance with the invention made of filled PTFE bearing material where the inner bore of the cavity is 2.5 inches in diameter is as set forth in Example 2, except that faces 80 and 82 are flat except where receiving opening 72 intersects face 80. The outer diameter of locking collar 71 matches the bore of the device cavity and the inner diameter is about 0.750 less.

It can readily be seen that a locking collar to fix the axial position of a cylindrical seal element in a seal system constructed in accordance with the invention can be easily installed in a cylindrical cavity or lumen, such as a conventional rotary impeller pump without the need to use pins necessary to guarantee alignment due to the one-piece bushing construction of the seal upon installation. When in place, a bearing seal element can support the impeller end of the pump shaft, providing an additional bearing surface to aid in eliminating the whip commonly found in pump shafts. Since there is clearance between the pump shaft and the locking collar seal fluid or water entering the lantern ring groove would be at the motor end of the cavity, thereby minimizing the quantity of the product being pumped at the motor end of the cavity.

The various modification to the locking collar in accordance with the invention allow for a quick and easy installation. The need for flexible packing rings and the cutting to properly fit them is avoided and the axial position of the sealing element is secured.

It will thus be seen that the object set forth above, among those made apparent from the preceding description are efficiently attained and, since certain changes may be made in the device set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, may be said to fall there between.

What is claimed is:

1. A locking collar comprising:
   a first substantially rigid semi-circular ring-shaped segment having an outer diameter corresponding to an inner bore of a cylindrical cavity having a first diameter with a first end and a second end having a cooperating face; and
   a second substantially rigid semi-circular ring-shaped segment having the same outer diameter as that of the first segment and a first end and a second end having a cooperating face,
   wherein the first ends of each semi-circular segment are hinged together and the second ends are in contact to form a cylindrical ring-shaped body having a slit and an outer diameter closely matching the first diameter of the inner bore of the cavity and the ring having an inner diameter greater than and spaced apart from a shaft positioned along the axis of the cylindrical cavity, and
   wherein at least one of the cooperating faces of the hinged semi-circular segments forming the slit includes a threaded screw receiving opening configured so that when a threaded screw is threaded into the screw receiving opening, the screw urges the two hinged semi-circular segments apart so that the outer surface of the ring to engages the inner bore of the cylindrical cavity.

2. The locking collar of claim 1, wherein each hinged semi-circular segment is formed of a non-ferrous metal material.

3. The locking collar of claim 1, wherein each hinged semi-circular segment is formed from a thermoplastic material.

4. The locking collar of claim 3, wherein the thermoplastic material is filled.

5. The locking collar of claim 1, wherein each hinged semi-circular segment is formed from a polytetrafluoroethylene material.

6. The locking collar of claim 1, wherein each hinged semi-circular segment is formed from a perfluoroalkoxy material.

7. The locking collar of claim 1, wherein the end of one of the semi-circular segments forming the slit has a projection and the corresponding end of the second semi-circular segment has a cooperating notch for receiving the projection and a threaded opening extending through at least a portion of the notch, the threaded opening configured so that when the collar is closed and the projection sits within the notch and a locking screw is threaded into the threaded screw receiving opening, the screw urges the two semi-circular segments apart.

8. A combination of a seal cavity of a rotary mechanical device having an inner bore and a rotating shaft coupled to a motor and a locking collar of claim 1 for use in the seal cavity,
   wherein the cylindrical body has an outer diameter dimensioned to fit against the inner bore of the seal cavity over the shaft, and
   wherein the cylindrical body has an inner diameter greater than the outer diameter of the shaft.

9. The locking collar of claim 8, wherein each cooperating face of the segments forming the slit is substantially flat and the first segment has an angled threaded opening extending through at least a portion of the flat face at the slit so that when the cooperating faces are in contact and a threaded screw is inserted into the angled screw receiving opening, the two segments are urged apart against the inner bore of the cavity.

10. The locking collar of claim 1, wherein each face of the segments forming the slit is substantially flat with a portion of a threaded opening so that when the two segments are in contact and a threaded screw is threaded into the threaded opening, the two segments are urged apart against the inner wall of the cavity.

11. The locking collar of claim 1, wherein each face of the segments forming the slit is substantially flat and the first segment has an angled threaded opening extending through at least a portion of the flat face at the slit so that when the cooperating faces are in contact and a locking screw is threaded into the angled screw receiving opening, the two segments are urged apart.

12. The locking collar of claim 1, wherein each face of the segments forming the slit is substantially flat with a portion of a threaded opening so that when cooperating faces of the collar are in contact and a threaded screw is threaded into the opening, the two segments are forced apart and urged against the inner wall of the cavity.

13. A method of installing a locking collar to engage the inner bore of a cylindrical cavity of a first diameter, comprising:
- providing first and second substantially rigid semi-circular ring-shaped segments hinged together at one end with a slit at the other end to form a cylindrical body having an outer diameter corresponding to the inner diameter of the cylindrical cavity dimensioned to fit and lock against the inner bore of the cylindrical cavity, wherein at least one of the faces of the segments forming the slit includes at least a portion of a threaded screw receiving opening and is configured so that when the cylindrical body is positioned within the cylindrical cavity and a threaded screw is threaded into the screw receiving opening, the screw moves the two semi-circular segments apart to engage the inner bore and lock the collar in place;
- placing the collar against the inner bore of the cylindrical cavity; and
- threading a threaded screw into the threaded receiving opening to urge the segments apart and engage the inner bore.

14. A locking collar system for engaging the inner bore of a cylindrical cavity of a first diameter, comprising:
- a first substantially rigid semi-circular ring-shape segment having an outer diameter corresponding to the first diameter with a hingable first end and a second end with a cooperating face;
- a second substantially rigid semi-circular ring-shape segment having the same outer diameter as that of the first segment and a hingable first end and a second end with a cooperating face, wherein the hingable first ends of each semi-circular segment together form a hinge and the cooperating faces together form an opposed slit when in contact, forming a cylindrical ring-shaped body having an outer diameter closely matching the first diameter of the inner bore of the cavity and an inner diameter greater than and spaced apart from a shaft positioned along the axis of the cylindrical cavity; and
- a threaded screw member,
- wherein at least one of the faces of the hinged semi-circular segments forming the opposed slit includes a threaded screw receiving opening configured so that when the cylindrical body is positioned within the cylindrical cavity and the threaded screw member is threaded into the screw receiving opening, the screw urges the two hinged semi-circular segments apart.

15. A locking collar system comprising:
- a cylindrical cavity having an inner bore of a first diameter; and
- a locking collar comprising:
- a first substantially rigid semi-circular segment having an outer diameter corresponding to the given diameter of the cylindrical cavity with a first end, a second end, and a cooperating face at its second end; and
- a second substantially rigid semi-circular ring-shape segment having the same outer diameter as that of the first segment and a first end, a second end, and a cooperating face at its second end,
- wherein the first ends of each semi-circular segment are hinged together and the respective second ends have cooperating faces that form an opposed slit when in contact, forming a cylindrical ring-shaped body,
- wherein the cylindrical body has an outer diameter closely matching the first diameter of the inner bore of the cavity and an inner diameter greater than and spaced apart from a shaft positioned along the axis of the cylindrical cavity, and
- wherein at least one of the cooperating faces of the hinged semi-circular segments forming the slit includes a threaded screw receiving opening configured so that when the cylindrical body is positioned within the cylindrical cavity and a threaded screw is threaded into the screw receiving opening, the screw urges the two hinged semi-circular segments apart to engage the inner bore to lock the collar in place axially.

16. The locking collar system of claim 15, wherein each hinged semi-circular segment is formed of a non-ferrous metal material.

17. The locking collar system of claim 15, wherein each hinged semi-circular segment is formed from a thermoplastic material.

18. The locking collar system of claim 17, wherein the thermoplastic material is filled.

19. The locking collar system of claim 15, wherein each hinged semi-circular segment is formed from a polytetrafluoroethylene material.

20. The locking collar system of claim 15, wherein the body each hinged semi-circular segment is formed from a perfluoroalkoxy material.

21. The locking collar system of claim 15, wherein the second end of the first semi-circular segment forming the slit has a notch projection and the second end of the second semi-circular segment has a cooperating receiving slit and the second end of the second semi-circular segment has a threaded opening extending through at least a portion of the receiving slit configured so that when the collar is closed about the shaft and the projection sits within the receiving slit and a threaded screw is threaded into the locking screw receiving opening, the screw urges the two semi-circular segments apart against the inner bore of the cavity.

22. A shaft sealing system, comprising:
- a substantially rigid cylindrical sealing body dimensioned to fit into a seal cavity of a rotary mechanical device having an output end and a motor end, the device being driven by a rotating shaft coupled to a motor, the sealing body having an outer surface closely dimensioned to fit into the seal cavity along the full length of the cylindrical body to fit over the shaft at one end of the seal cavity; and
- a locking collar formed of a first and second substantially rigid semi-circular segment hinged together with an opposed slit to form a cylindrical body having an outer diameter dimensioned to fit and lock against an inner bore of the seal cavity spaced apart from the shaft and having an inner diameter greater than the outer diameter of the shaft;
- wherein at least one of the cooperating faces of the segments of the collar forming the slit includes at least a portion of a threaded screw receiving opening so that when a threaded screw is threaded into the screw receiving opening, the two segments are urged apart and engage the inner bore of the cavity to lock the collar in place; and
- wherein the locking collar is positioned against one end of the sealing body to hold the sealing body in position in the one end of the cavity.

* * * * *